United States Patent
Smarandache

(10) Patent No.: US 7,158,865 B2
(45) Date of Patent: Jan. 2, 2007

(54) CURRENT DRIVER EMPLOYING PULSE-WIDTH MODULATION

(76) Inventor: Sandu Margarit Smarandache, 55 Bristol Road East, unit 9B, Mississauga, Ontario (CA) L4Z 3N9

( * ) Notice: Subject to any disclaimer, the term of this patent is extended or adjusted under 35 U.S.C. 154(b) by 242 days.

(21) Appl. No.: 10/785,058

(22) Filed: Feb. 25, 2004

(65) Prior Publication Data

US 2005/0231253 A1    Oct. 20, 2005

(51) Int. Cl.
G05D 3/12    (2006.01)
H02P 7/29    (2006.01)
H03K 7/08    (2006.01)

(52) U.S. Cl. ............... 700/295; 388/811; 388/819; 332/109

(58) Field of Classification Search ........... 700/295, 700/296, 297; 388/819, 804, 811; 332/109; 375/238
See application file for complete search history.

(56) References Cited

U.S. PATENT DOCUMENTS 4,403,292 A * 9/1983 Ejzak et al. ............ 700/297
4,801,874 A * 1/1989 Loeffler ................. 324/142
5,298,857 A * 3/1994 Voisine et al. ........... 324/142
5,473,497 A * 12/1995 Beatty ................... 361/23
5,589,805 A * 12/1996 Zuraski et al. .......... 332/109
2002/0050579 A1* 5/2002 Near ..................... 251/129.05

* cited by examiner

Primary Examiner—Thomas Pham

(57) ABSTRACT

A current driver capable of generating a controlled current in the form of a pulse-width modulation (PWM) signal suitable for controlling an electronic device such as a solenoid is disclosed. The current driver has a feedback loop incorporating a dual-slope integrator. During an integration phase, which has a duration of one or more PWM periods, the dual-slope integrator integrates a signal indicative of the current flowing through the device. During a de-integration phase, the time required for the integrated signal to discharge at a known rate is measured. The measured time and integration phase duration are used to determine average output current. Any error between the measured and desired average output current is corrected by way of a multiplicative corrective factor or an additive corrective factor. The integration and de-integration phases may occur during alternating PWM periods.

22 Claims, 7 Drawing Sheets

CURRENT DRIVER EMPLOYING PULSE-WIDTH MODULATION

FIELD OF THE INVENTION

The present invention relates to a current driver which provides a controlled current suitable for controlling an electronic device such as a solenoid. More particularly the present invention relates to current driver which provides a controlled current in the form of a pulse-width modulation (PWM) signal.

BACKGROUND OF THE INVENTION

Control systems capable of generating an electronic pulse-width modulation signal for controlling electronic devices are well known. Such systems are commonly employed to control solenoids which are used to open and close valves in hydraulic systems.

When an electronic device is controlled through PWM, correction of the output PWM signal may be necessary, either due to fluctuations in power supply voltage or due to fluctuations in the inductance and resistance of the electronic device resulting from changes in temperature and valve spool position. This correction is commonly achieved through feedback control of the output PWM signal.

Feedback control is typically performed by determining average current flow through the electronic device, comparing the measured average current to a desired value, and adjusting the duty cycle of the PWM signal appropriately if the average current differs from the desired value.

Disadvantageously, and as will be described later in greater detail, both the manner in which the average current is determined and the manner in which the measured average current is compared to the input value may introduce error or delay into the output PWM signal.

Average current is typically determined by passing a voltage proportional to the current flowing through the device through an RC circuit which serves as a low-pass filter. The low-pass filter "smooths" the voltage to a DC value. Two problems may result from the use of such a low-pass filter. First, the output of the low pass filter can still have an AC component, resulting in a measured average current which fluctuates over time. The measured average current may therefore be erroneous depending upon the exact moment in time at which the value is sampled. Secondly, because the RC circuit introduces lag, a delay will exist between any input adjustments and a resultant change in the output PWM signal. Moreover, this delay will be variable depending upon the PWM signal frequency. This is due to the fact that the RC circuit has a fixed cut-off frequency. When the output PWM frequency is changed, the number of degrees out-of-phase between the input signal and the output signal will also change.

Comparison of the measured average current (i.e. output of the low-pass filter) to the input value is typically performed using a proportional-integral (PI) error amplifier. This component also disadvantageously introduces a delay between any input adjustments and resultant output PWM signal changes.

What is needed is a solution which addresses at least some of these difficulties.

SUMMARY OF THE INVENTION

A current driver capable of generating a controlled current in the form of a pulse-width modulation signal suitable for controlling an electronic device such as a solenoid is disclosed. The current driver has a feedback loop incorporating a dual-slope integrator. During an integration phase, which has a duration of one or more PWM periods, the dual-slope integrator integrates a signal indicative of the current flowing through the device. During a de-integration phase, the time required for the integrated signal to discharge at a known rate is measured. The measured time and integration phase duration are used to determine average output current. Any error between the measured and desired average output current is corrected by way of a multiplicative corrective factor or an additive corrective factor. The integration and de-integration phases may occur during alternating PWM periods, such that correction of average output current may be initiated within two PWM periods of the occurrence of measurable error.

In accordance with an aspect of the present invention there is provided a method of providing a controlled current to an electronic device, comprising: producing a pulse-width modulation signal to provide said current; measuring an average of said current provided to the electronic device using a dual-slope integrator; and setting a duty cycle of said pulse-width modulation signal based, at least in part, on said measuring.

In accordance with another aspect of the present invention there is provided a system for providing a controlled current to an electronic device, comprising: a pulse-width modulation signal generator for providing said current; a dual-slope integrator for use in measuring an average current supplied to the electronic device, said measuring resulting in a measured average current; and a duty cycle calculator for calculating a duty cycle of said pulse-width modulation based, at least in part, on said measured average current.

In accordance with still another aspect of the present invention there is provided a computer-readable medium storing instructions which, when executed by a computing device in a system for providing a controlled current to an electronic device by way of a pulse-width modulation signal, cause said computing device to: (a) calculate from measurements produced by a dual-slope integrator a measured average current supplied to the electronic device; and (b) set a duty cycle of said pulse-width modulation signal based, at least in part, on said measured average current.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
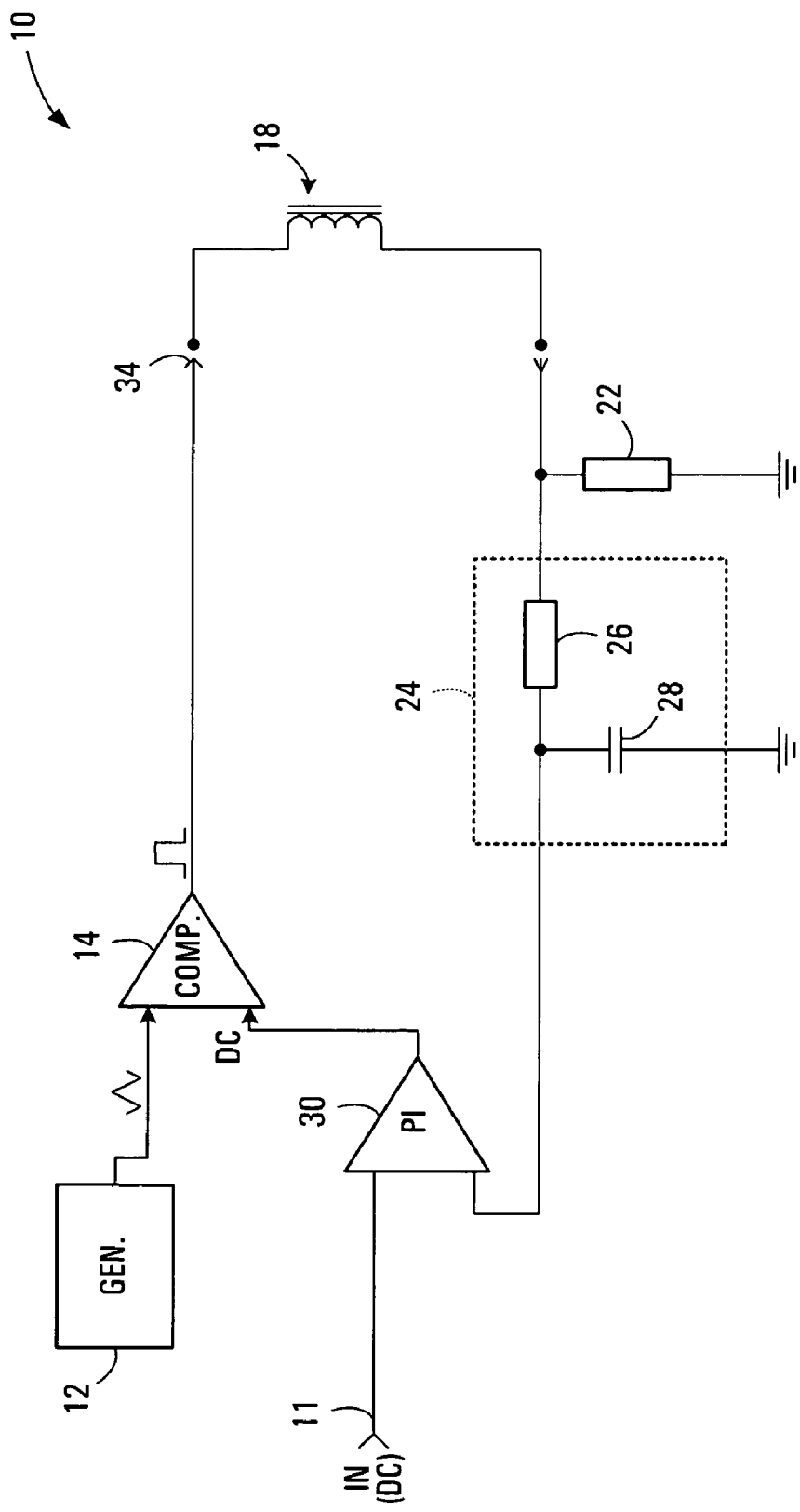
FIG. 1 is schematic diagram illustrating a known control system for generating a PWM signal.

FIG. 1 illustrates a known closed-loop control system 10 for generating a pulse-width modulation signal. The control system 10 has an input 11 and an output 34. The input 11 is for connection to a DC voltage which represents a desired average output current setting. The output 34 provides a generated PWM signal for driving an external electronic device, such as a solenoid 18, which signal has an average current that is proportional to the input DC voltage.

Control system 10 includes a triangular waveform generator 12 and a comparator 14. These two components are used to generate the output PWM signal. More specifically, the output of the triangular waveform generator 12 serves as one input to the comparator 14. The other input to the comparator 14 is a signal representative of error between desired output current (i.e. the voltage applied to input 11) and measured output current. The error value is a DC voltage whose level is between the maximum and minimum voltage of the triangular waveform. Depending on the value of the DC voltage, the comparator 14 will output a PWM signal with a duty cycle between 0% and 100%. The generated PWM signal is fed through a power transistor (not shown) for output at output 34.

The feedback portion of the control system 10 includes a sampling resistor 22, an RC circuit 24 comprising a resistor 26 and capacitor 28, and an error amplifier 30. The sampling resistor 22 provides a voltage proportional to (i.e. following) the current flowing through device 18. The RC circuit 24, which serves as a low-pass filter, receives this fluctuating input voltage and smooths it to a DC value representing the average output current of control system 10. The error amplifier 30 is a proportional-integral amplifier which compares the smoothed average current from RC circuit 24 to the input voltage and generates an error signal based on any discrepancy between the two.

As indicated above, both the manner in which the average current is measured and the manner in which the measured average current is compared to the input value in control system 10 may result in error or delay in the output PWM signal.

In particular, when RC circuit 24 is used to measure average current, the measured value can still have an AC component. This fluctuation propagates though error amplifier 30 to comparator 14. As a result, the duty cycle of the generated PWM signal may erroneously fluctuate.

Moreover, lag introduced by RC circuit 24 will result in a delay between any input voltage adjustments and the resultant change in the output PWM signal. Disadvantageously, the delay will be variable depending upon the current PWM signal frequency. Also, the "integral" aspect of proportional-integral error amplifier 30 will also yield a delay between any input adjustments and resultant output PWM signal changes.

Figure 2:
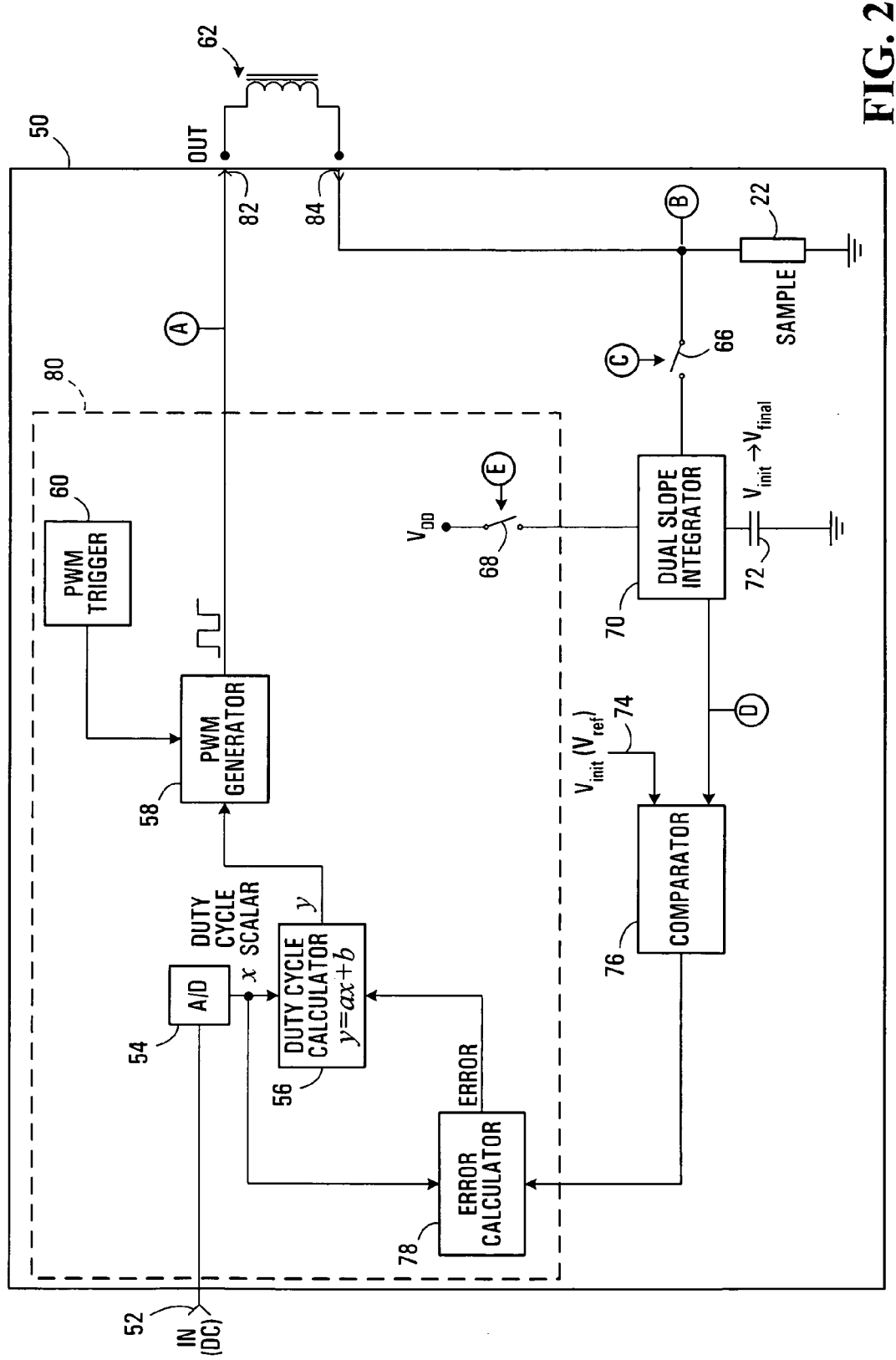
FIG. 2 is a schematic diagram illustrating a current driver for generating a PWM signal exemplary of the present invention.

Referring to FIG. 2, a pulse-width modulation current driver 50 exemplary of an embodiment of the present invention is illustrated. The current driver 50 has an input 52 and an output 82. The input 52 is for connection to a variable DC voltage, as may be generated by a potentiometer for example. The output 82 provides a generated PWM signal suitable for driving an electronic device, such as a solenoid 62. The generated PWM signal has an average current proportional that is to the input DC voltage.

The current driver 50 is made up of various modules and components, including: an analog-to-digital (A/D) converter 54; a duty cycle calculator 56; a PWM generator 58; a PWM trigger generator 60; a sampling resistor 64; a dual-slope integrator 70; switches 66 and 68; a comparator 76; and an error calculator 78.

A/D converter 54 converts the DC voltage applied to input 52 into a digital value. The A/D converter 54 may for example be a 10-bit A/D converter which converts input voltages to a number from 0 to 1023. The number output by the A/D converter 54 is referred to herein as the "digitized input voltage". As will be appreciated, the input voltage and digitized input voltage both represent a desired average output current.

Duty cycle calculator 56 is a module which receives the digitized input voltage output by the A/D converter 54 and generates therefrom a number representative of a duty cycle of 0% to 100%. The number is computed according to the following equation:

$$y = ax + b \quad (1)$$

where "y" is the number representative of a duty cycle of 0% to 100%, "x" is the digitized input voltage, "a" is a multiplicative corrective factor and "b" is an additive corrective factor.

As will be appreciated, the values "a" and "b" of equation (1) are used to correct the duty cycle in the event that the measured average output current differs from the desired average output current. The multiplicative corrective factor "a" is used for more substantial corrections while the additive corrective factor "b" is used for comparatively subtle corrections. The magnitude of factors "a" and "b" is determined by the degree of difference or "error" between the measured average output current and the desired average output current, which is received by the duty cycle calculator 56.

The precision of the output number "y" of equation (1), which is represented as a digital value as will be described, is based upon the number of bits used to represent "y". For example, in the case where "y" is represented using a 16-bit word, "y" will range from 0 to 65,535; a unit increase in "y" would thus correspond to an increase in duty cycle of approximately 0.0015%. The value "y" is referred to as the "duty cycle scalar".

PWM generator 58 is a module which generates the PWM signal that drives solenoid 62. PWM generator 58 receives duty cycle scalar "y" indicative of a desired output duty cycle from calculator 56. Generator 58 also periodically receives a pulse from PWM trigger generator 60 which indicates that a new PWM period should be commenced. These two inputs are used to generate the output PWM signal. It will be appreciated that the output of PWM generator 58 may not directly drive the solenoid 62, but may actually drive a power stage (e.g. power transistor) which in turn drives the solenoid 62.

PWM trigger generator 60 is a component which periodically generates a pulse indicating that a new PWM period should be commenced. The interval between pulses is determined by the current PWM frequency setting, which is configurable via a user interface (UI) of current driver 50. The UI is not illustrated in FIG. 2.

Sampling resistor 64 is a resistor of known value that is used to convert the current flowing through the electronic device 62 into a corresponding voltage. Sampling resistor 64 is interconnected between input 84 and ground. Input 84 is another input to the current driver 50 which serves as a "return" from the electronic device 62. That is, the electronic device 62 to be driven by the current driver 50 is connected between output terminal 82 and input terminal 84.

Dual-slope integrator 70 is an electronic component which integrates an unknown input voltage for a fixed amount of time (the "sampling interval") and then "de-integrates" using a known reference voltage for a variable amount of time. Integration and de-integration is effected by way of a capacitor 72 which is charged from an initial voltage ("$V_{init}$") to a final voltage ("$V_{final}$") during the integrating phase and discharged linearly back from the final voltage to the initial voltage during the de-integrating phase. As will be appreciated, the dual-slope integrator 70 is used for purposes of measuring the average output current generated by the current driver 50. It is noted that, although capacitor 72 is illustrated as a separate component from dual-slope integrator 70 in FIG. 2, this is only for purposes of discussion. Capacitor 72 actually forms part of the dual-slope integrator 70.

Switches 66 and 68 are used to control the integration and de-integration performed by the dual-slope integrator 70. As will be described, during the integration phase, switch 66 is closed and switch 68 is opened; during the de-integration phase, switch 66 is opened and switch 68 is closed. In the present embodiment, switch 66 is a MOSFET transistor, while switch 68 is a complementary metal-oxide semiconductor (CMOS) microcontroller output varied between 0V and 5V (as will be described).

Comparator 76 is employed during the dual-slope integrator's de-integration phase to compare the integrator output voltage against reference voltage $V_{ref}$. The comparison against voltage $v_{ref}$ is based on the fact that the initial voltage $V_{init}$ of the capacitor 72 will be equal to $v_{ref}$ at the beginning of the integration phase. The comparator 76 trips when the linearly dropping output voltage of the discharging capacitor 72 drops below $v_{ref}$. The tripping of comparator 76 is effectively used to stop a timer which was commenced when linear discharge of the capacitor 72 was initiated at the beginning of the de-integration phase. Comparator 76 thus facilitates calculation of the duration of the de-integration phase, which duration is indicative of the average output current, as will be described.

Error calculator 78 is a module which compares the desired average output current (as represented by the digitized input voltage "x") against the measured average output current (as determined from the duration of the de-integration phase and the sampling interval) and generates an error value based on any discrepancy between the two. A positive error value indicates that the measured average output current is greater than the requested level specified by the input voltage while a negative error value indicates the opposite (this may be reversed in alternative embodiments). A value of zero indicates that the average output current of the current driver 50 is correct, i.e., that the average output current matches the level requested by the input voltage setting applied to input 52. As will be appreciated, non-zero error values trigger changes to the additive correction factor "b" and, in some cases, to the multiplicative corrective factor "a", for the purpose of correcting the average output current to its proper value. This in turn will restore the error value to zero (the steady state). The duty cycle of the PWM signal is thus effectively regulated based on the error value computed by the error calculator 78.

Figure 3:
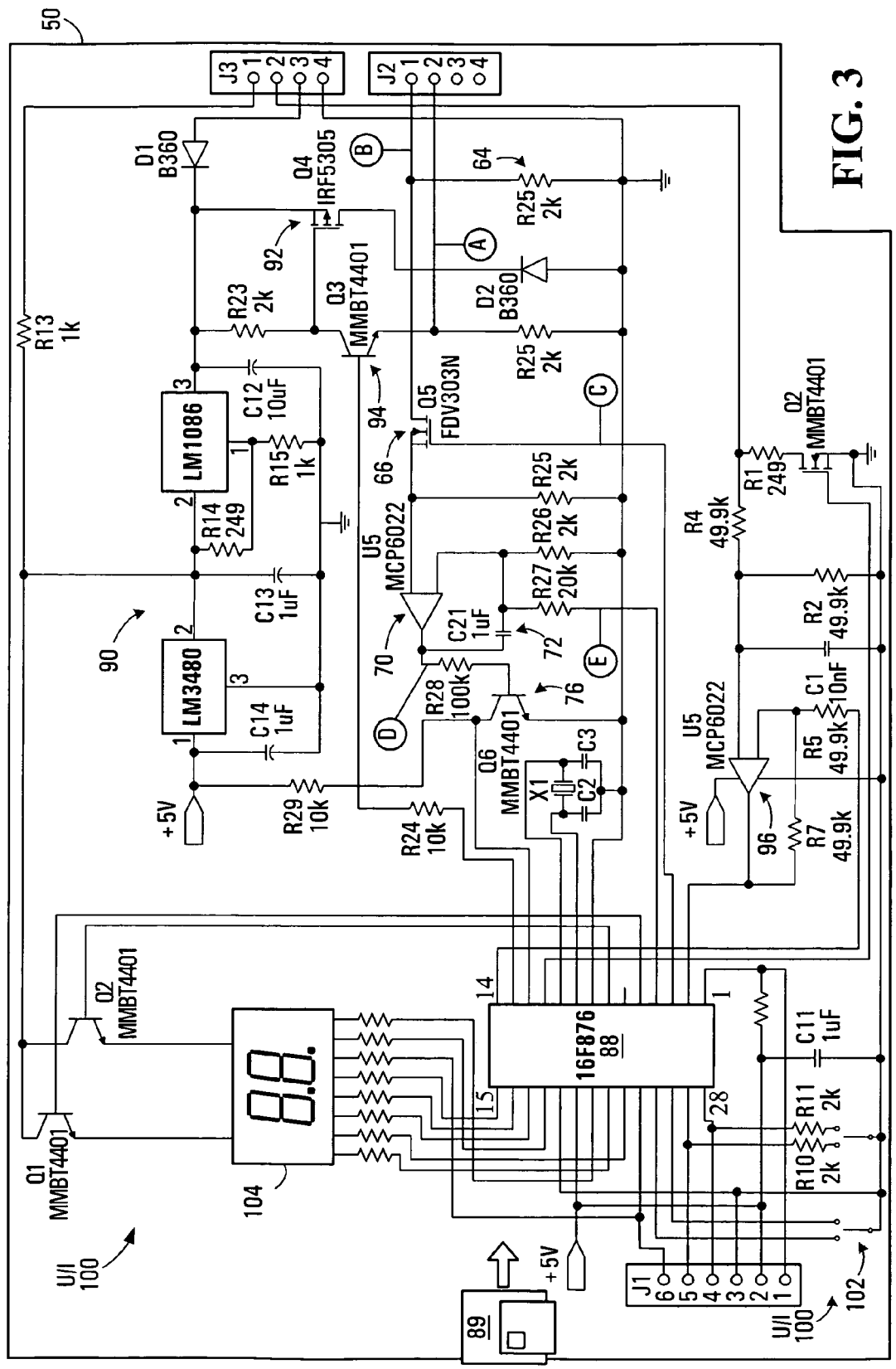
FIG. 3 is another schematic diagram illustrating the current driver of FIG. 2 in which certain components are shown in greater detail.

FIG. 3 is a schematic diagram illustrating the current driver 50 of FIG. 2 in which some components are shown in greater detail. Many of the features and components of current driver 50 shown in FIG. 2 are illustrated in FIG. 3. These include current driver inputs 52 and 84 and output 82, sampling resistor 64, switch 66, dual-slope integrator 70 including capacitor 72, and comparator 76. Certain of the components and modules illustrated in FIG. 2 are not expressly illustrated in FIG. 3, however. This is because these components are actually implemented using a microcontroller 88 operating under software control. The components and modules which are so implemented are indicated in FIG. 2 at 80. In particular, the A/D converter 54, duty cycle calculator 56, PWM generator 58, PWM trigger generator 60, switch 68 and error calculator 78 shown in FIG. 2 are all implemented by the microcontroller 88 under software control. In the present embodiment, the microcontroller 88 is a PIC16F876 microcontroller from Microchip Technology Inc. However, as recognized by those skilled in the art, other microcontrollers could be used in alternative embodiments. The microcontroller software may be loaded into the memory of microcontroller 88 from a computer readable medium 89, which could be an optical or magnetic disk, tape, or chip for example.

FIG. 3 also illustrates various features of current driver 50 not shown in FIG. 2, such as power supply 90, power transistor 92, pre-amplifier 94, and input amplifier 96. Also illustrated is user interface 100 by which a user may input and view various settings of current driver 50. The UI includes input switches 102 used to input settings and a twin seven-segment display 104 used to display the current settings.

Figure 4:
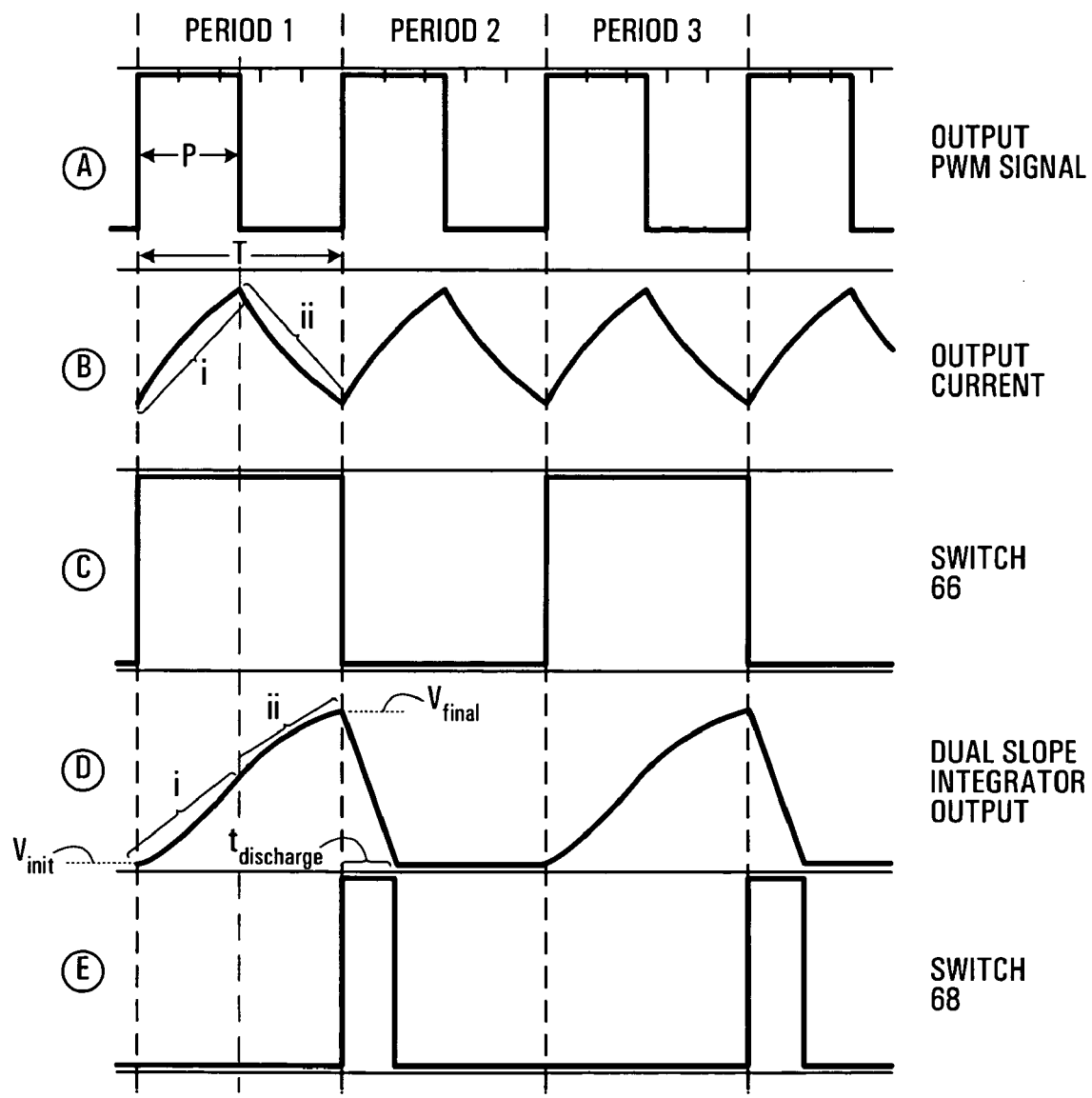
FIG. 4 contains signal diagrams showing voltages at various points in the current driver of FIGS. 2 and 3 during system operation.

Operation of the present embodiment is illustrated in FIGS. 4 to 7. Referring to FIG. 4, signal diagrams showing voltages at various points in the current driver 50 during system operation are illustrated. The vertical axes in FIG. 4 represent voltage while the horizontal axes represent time. Five signals labelled A to E are shown in FIG. 4. These signals are: A: output PWM signal; B: output current; C: control signal applied to switch 66; D: output of dual-slope integrator 70; and E: control signal applied to switch 68. The points at which these signals are measured in current driver 50 is indicated at A to E in each of FIGS. 2 and 3. It is noted that, although signal B is referred to as the "output current", it is actually a voltage proportional to the output current, which voltage is determined by sampling resistor 64 (FIGS. 2 and 3).

It is initially assumed that a user of the current driver 50 has employed user interface 100 to specify settings for current driver 50. These settings include a desired PWM signal frequency. One reason for adjusting the PWM frequency is to control "dither" in the electronic device 62. "Dither" refers to vibration in the electronic device 62 resulting from the fact that the current supplied to the device 62 has an AC component. In the case where the electronic device is a solenoid controlling a valve, for example, a certain amount of dither may be desirable to keep the valve from seizing. However, too much dither may be undesirable because it may introduce excessive vibration into the controlled mechanical system. PWM frequency may alternatively be referred to as "dither frequency".

Referring back to FIG. 2, it should be appreciated that the PWM trigger generator 60, which periodically generates a pulse indicating that a new PWM period should be commenced, is directly impacted by the dither frequency setting. In particular, changes to the dither frequency will change the time interval between pulses produced by the PWM trigger generator 60. In the present embodiment, the PWM trigger generator 60 is implemented using a timer of microcontroller 88 (FIG. 3). In this implementation, changes to the dither frequency setting will cause the value to which the timer counts before expiring to change.

During operation, the input voltage applied to input 52 of the current driver 50 is digitized by the A/D converter 54 every PWM period, yielding digitized input value "x". This value is supplied to the duty cycle calculator 56. The calculator 56 scales the digitized input value "x" by multiplicative corrective factor "a" and adds additive corrective factor "b" to generate a duty cycle scalar "y" according to equation (1) above. Upon system startup, the "a" and "b" factors are initialized to predetermined starting values. These starting values may be relatively small, as it is unknown on startup which electronic device 62 is being controlled or what error values are appropriate for the controlled device 62.

The duty cycle scalar "y" is provided to the PWM generator 58. PWM generator 58 also receives periodic pulses from the PWM trigger generator 60, each pulse indicating that another PWM period should be commenced. The PWM generator 58 uses the duty cycle scalar and its knowledge of the PWM period from PWM trigger generator 60 to generate output PWM signal A (FIG. 4). More specifically, the PWM generator 58 scales the duty cycle scalar "y" by a scaling factor in order to determine the proper duration P to hold the output signal at a high level in order to achieve the desired duty cycle given the current PWM frequency (see FIG. 4, period 1), and then holds its output high for that duration P. The value of the scaling factor used to compute P is tied to the current PWM period T: as T increases or decreases, so too does the scaling factor. It follows that the scaling factor is adjusted whenever the dither frequency is adjusted. The generated output PWM signal is provided to the electronic device 62 by way of power transistor 92 (FIG. 3).

Application of the output PWM signal A to the solenoid 62 results in an output current waveform having a "triangular" shape as shown in FIG. 4 at B. Current flowing through the device rises exponentially while the output is held high (i.e. during duration P), as shown at (i). Conversely, the current through the device falls exponentially when the output is held low, as shown at (ii). It is of course understood that the exponential waveform shape is due to the inductance of the solenoid 62, which opposes sudden changes in current flowing through the device.

Turning now to the feedback portion of current driver 50, at the commencement of PWM period 1, microcontroller 88 (FIG. 3) sends control signals C and E to switches 66 and 68 (FIG. 2) causing the switches to close and open respectively (see FIG. 4). The closing of switch 66 connects the non-inverting input of dual-slope integrator 70 to the sampled output current (which, again, is actually a voltage) at B. The opening of switch 68 (i.e. setting of microcontroller 88 CMOS output pin 4 to 0V) causes resistor R27 to become connected in parallel with R26, such that both R26 and R27 as well as capacitor 72 determine the integration constant of the dual-slope integrator 70 (FIG. 3). At this point the integration phase of the dual-slope integrator 70 commences.

During the integration phase, which lasts for one complete PWM period (period 1 of FIG. 4) in the present embodiment, the dual-slope integrator 70 effectively integrates the voltage B. The rationale behind having the integration phase last PWM period is that one PWM period is the minimum duration sample of the PWM signal that is known to repeat. When the current-following voltage B is integrated over a sampling interval of one PWM period and divided by the duration of the period, an average output current can be measured.

Integration is effected through charging of the capacitor 72 from an initial voltage $V_{init}$ to a final voltage $V_{final}$. The effect of the integration is shown at output D of the dual-slope integrator 70. As shown in waveform D of FIG. 4, charging of the capacitor 72 occurs in two stages. In the first stage, which has a duration P, the capacitor 72 charges quickly because voltage B is increasing (see waveform segment (i) of signal D and corresponding segment (i) of waveform B). In the second stage, which has a duration T minus P, the capacitor 72 charges more slowly because voltage B is decreasing (see waveform segments (ii) of signal D and B). It is noted that signal D continues to increase during the second stage despite the fact that the output PWM signal A is held low; this is due to the fact that the voltage B is still greater than zero during this stage (albeit decreasing).

At the beginning of PWM period 2, two things happen. First, a timer of microcontroller 88 used to time the duration of capacitor discharge is started. Second, the microcontroller 88 reverses the levels of control signals C and E, causing switches 66 and 68 to open and close respectively (see FIG. 4). The opening of switch 66 disconnects the input of dual-slope integrator 70 from the voltage B, and the closing of switch 68 (i.e. setting of pin 4 of microcontroller 88 to 5V) commences discharging of capacitor 72 at a known rate. This commences the de-integration phase of the dual-slope integrator 70.

The objective of the de-integration phase is to determine the duration $t_{discharge}$ required for the capacitor 72 to discharge from its final voltage $V_{final}$ back to its initial voltage $V_{init}$. This duration will reflect the amount of charge stored by the capacitor during PWM period 1. The duration is used in conjunction with current PWM period duration to determine the measured average output current of the current driver 50. The measured average output current is compared to the input voltage applied to input 52 to determine whether or not the generated average output current is correct.

During the de-integration phase, capacitor 72 discharges with a constant current. In the present embodiment, de-integration is actually effected by way of integration using the inverting input of dual-slope integrator 70. This results in a linearly-dropping capacitor voltage, which is apparent at the output D of the dual-slope integrator 70 (see FIG. 4 at D). The reason that the capacitor 72 voltage drops linearly, and not exponentially as when a parallel resistor is used, is because a constant current is used to discharge it. As best seen in FIG. 2, the output of the dual-slope integrator 70 forms one input to the comparator 76. The other input 74 is a fixed reference DC voltage $V_{init}$.

When the output D of dual-slope integrator 70 falls just below reference voltage $V_{init}$, the comparator 76 trips. Upon detection of the tripping of the comparator 76, the microcontroller 88 stops the timer to obtain $t_{discharge}$. At this point the de-integration phase is complete and the discharging of capacitor 72 is terminated. Both of switches 66 and 68 are left open for the remainder of PWM period 2.

In the error calculator 78, the duration $t_{discharge}$ and current PWM period duration are used to determing a measured average output current. The measured average output current is compared against the digitized input voltage "x". An error value based on any discrepancy between the two is generated, with a zero error value indicating that the measured average output current is correct (in some embodiments, the error value may never actually be zero;

correctness may instead be indicated when the result of a subtraction between the desired and the actual value is a very small positive or negative value).

It will be appreciated that, in order to ensure that a zero (or minimal) error value computed by the error calculator 78 truly does indicate a correct average output current, the scaling performed by the A/D converter 54 and by various stages of the current driver 50 should effectively "cancel". These stages include the PWM generator 58 (which applies a scaling factor to "y" based on the current PWM frequency), the sampling resistor 64 (where scaling is controllable through selection of a value of resistor 64), the capacitor 72 of the dual-slope integrator 70 (where scaling is controllable through selection of a C value), and by the granularity of the "ticks" counted by the timer which calculates $t_{discharge}$. These scaling factors are of course a design-time consideration. Selection of appropriate scaling factors will be well within the capabilities of a person skilled in the art. Typically, the selection is a compromise between various considerations, possibly including the following: Sampling resistor 64 (FIG. 3) should not be too large or usable supply voltage loss and overheating may result; conversely sampling resistor 64 should not be too small or noise and printed circuit board track resistance may affect precision. Resistor R25 should not be too large or op-amp bias input current and its drift may affect precision; on the other hand resistor R25 should not be too small or the op-amp output may be overloaded. Capacitor 72 should not be too large or dual-slope integrator 70 may become vulnerable to noise and op-amp input offset and drift; conversely capacitor 72 should not be too small or charging time may be too small to be detectable with acceptable resolution. Resistor R27 should not be too large or discharge time may be too short to maintain acceptable resolution; on the other hand resistor R27 should not be too small or discharging time will extend beyond the end of PWM period 2. The A/D converter 54 will dictate the range of the input numbers, while the microcontroller operating frequency will dictate the relationship between numbers and timing.

The time $t_{discharge}$ to discharge the capacitor 72 to its initial voltage $V_{init}$ should be sufficiently short to complete before the end of the second PWM period 2, and with sufficient remaining time in PWM period 2 to permit adjustment of additive corrective factor "b" and/or multiplicative corrective factor "a" (as will be described below) with enough remaining time to be made effective in PWM period 3. This is to limit delay between the occurrence of an error in average output current and its subsequent correction.

When error calculator 78 has completed its calculation of the error value, the error value is forwarded to the duty cycle calculator 56. The latter calculator uses the error value in its determination of corrective factors "a" and "b", which will be applied during the immediately following PWM period (e.g. PWM period 3 in FIG. 4). Advantageously, correction of erroneous average output current produced by current driver 50 is initiated within two PWM periods of the occurrence of measurable error.

Figure 5:
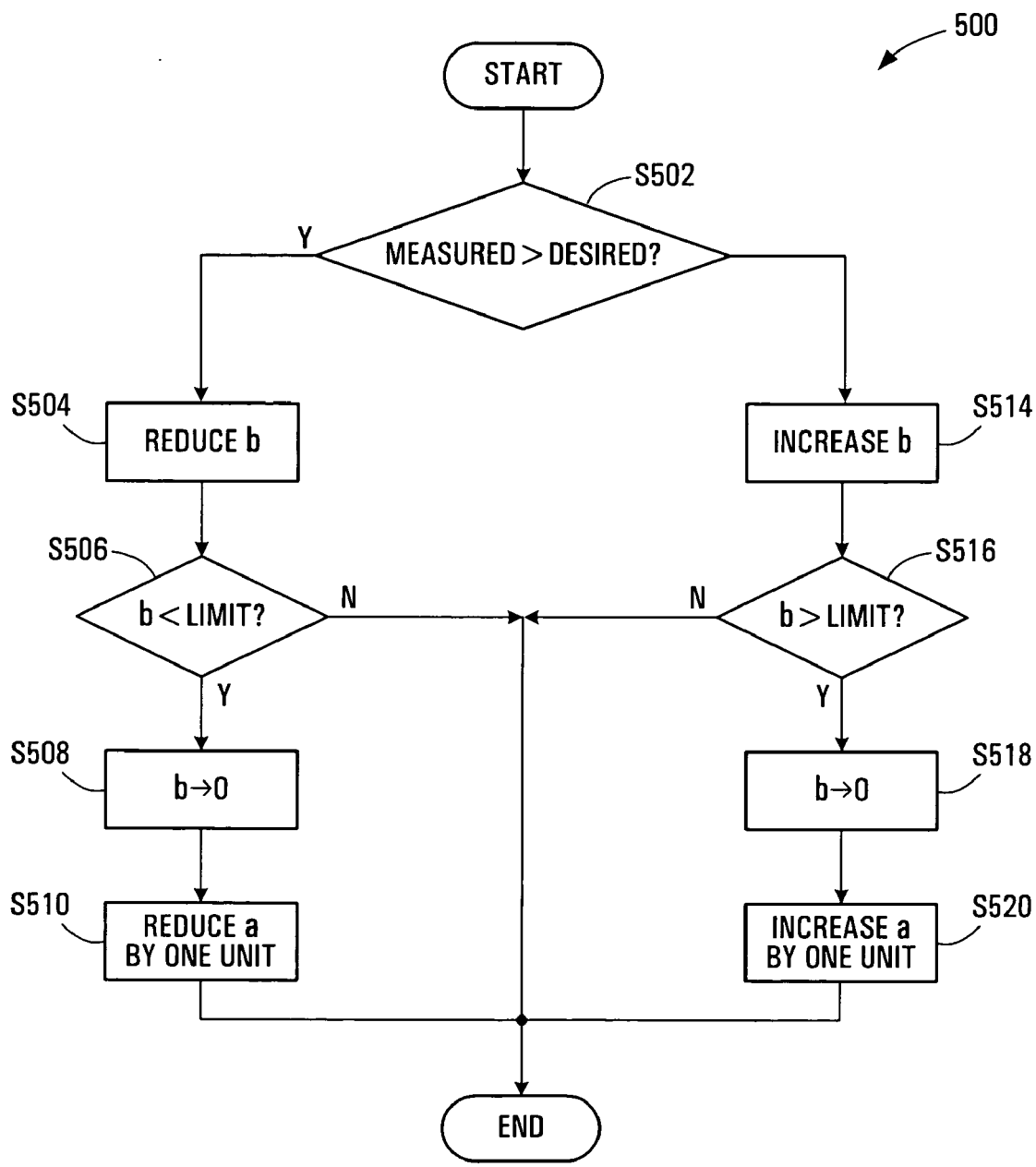
FIG. 5 is a flowchart illustrating operation of the current driver of FIGS. 2 and 3.

Operation for determining corrective factors "a" and "b" is illustrated in FIG. 5 at 500. It will be appreciated that operation 500 is executed every second PWM period during operation of the current driver 50 (i.e. corrective factors "a" and/or "b" are adjusted, if necessary, every two periods).

As shown in FIG. 5, if the measured average output current is greater than the desired average output current (S502), additive corrective factor "b" is reduced by a first fixed amount (S504). If this reduction causes "b" to drop below a predetermined limit (S506), "b" is zeroed (S508) and "a" is reduced by one unit (S510). The purpose of decreasing factors "a" and/or "b" is of course to decrease the duty cycle of the output PWM signal.

Figure 6:
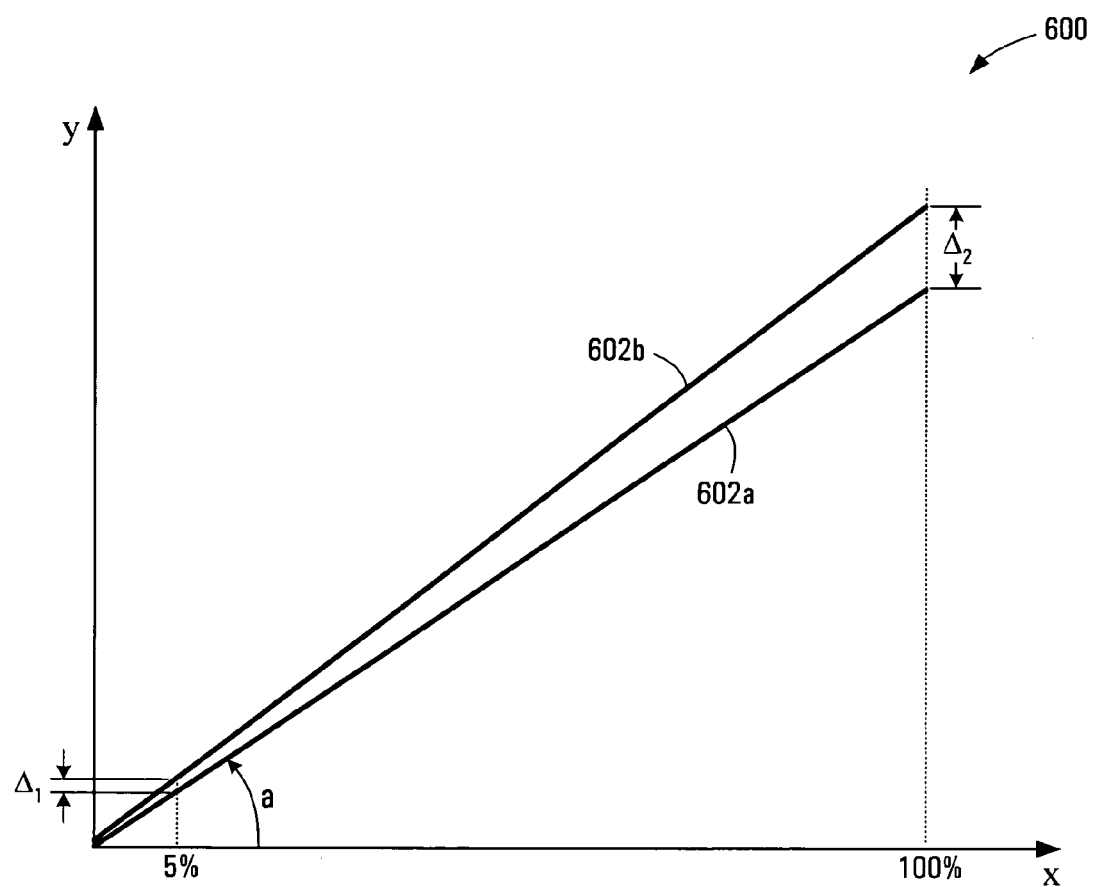
FIGS. 6 and 7 illustrate transfer functions of digitized input voltage to PWM signal duty cycle.
Figure 7:
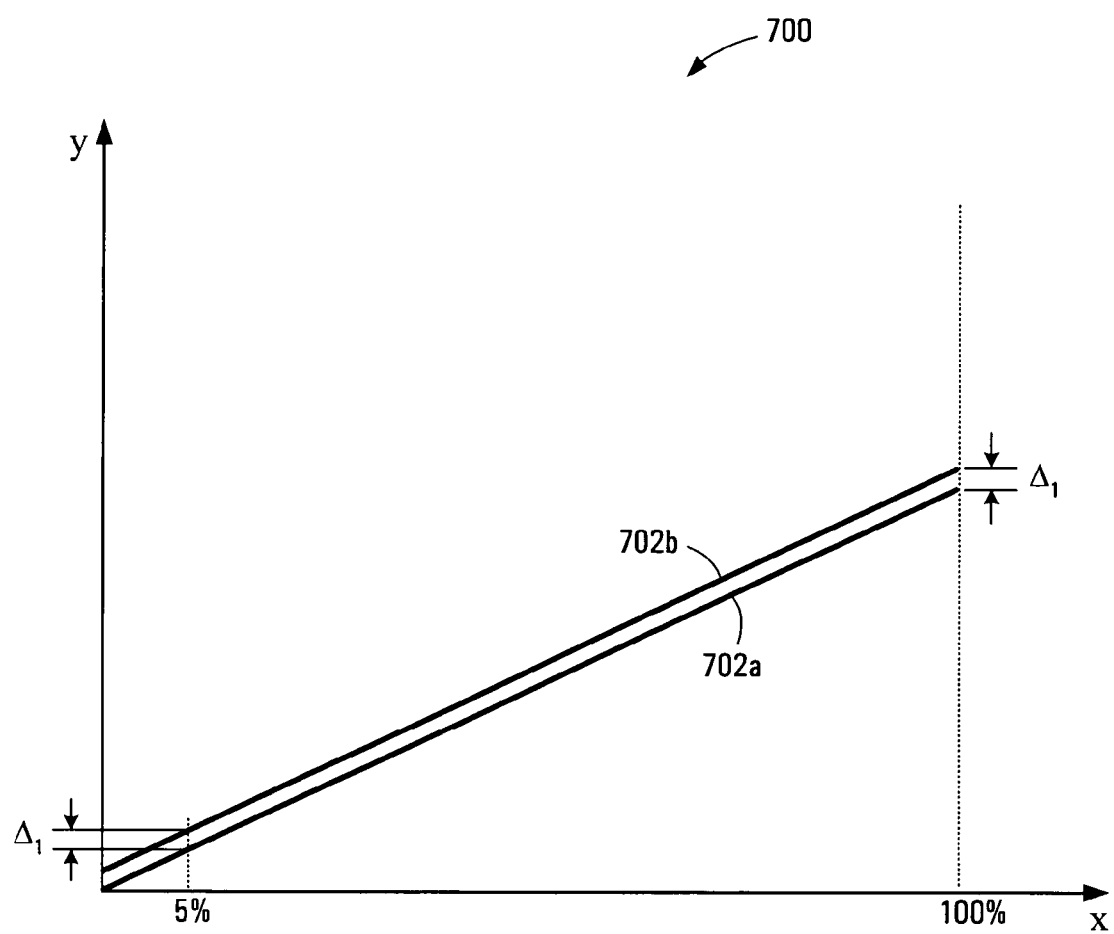

The rationale for the above described method of determining corrective factors is perhaps best understood with reference to FIGS. 6 and 7. FIG. 6 illustrates the relationship of digitized input voltage "x" to duty cycle scalar "y" assuming "b" is fixed at zero (i.e. assuming equation (1) can be reduced to y=ax.). The transfer function between "x" and "y" is illustrated as a line 602a. Multiplicative corrective factor "a" is represented as the angle between the horizontal axis and line 602a.

It is initially assumed that the input voltage to the current driver 50 is at 5% of its maximum value (e.g. the input voltage is 0.5V in a range of 0V to 10V). It is further assumed that an error value $\Delta_1$ is found to exist between the measured average output current and the desired average output current.

If "a" is adjusted to correct error $\Delta_1$, the resulting transfer function will be as illustrated at 602b. Provided that the input voltage "x" is maintained at its 5% of maximum setting (0.5 v), the adjustment to "a" will successfully compensate for error $\Delta_1$. However, if the input voltage is suddenly increased to 10V (i.e. to 100% of its maximum value), the corrective effect of multiplicative factor "a" will effectively be magnified, possibly resulting in a large discrepancy $\Delta_2$ between the generated average output current and the desired average output current. This is because the duty cycle calculator 56 operates on a digital representation of "a" whose granularity is limited based on the number of bits used to represent "a". Moreover, the discrepancy $\Delta_2$ will be apparent upon the first PWM period after the input voltage has been set to 10V. This is because the duty cycle calculator 56 (FIG. 2) in most cases is able to respond to changes in "x" in time for the next PWM period (A/D conversion delays at A/D converter 54 and scaling delays at PWM generator 58 typically being minimal). This quick response time to changes in input voltage is one of the advantages of the present embodiment.

Turning to FIG. 7, the transfer function of digitized input voltage "x" to duty cycle scalar "y" assuming that "b" is variable is illustrated as a line 702a. It is again assumed that the input voltage to the current driver 50 is initially at 5% of its maximum value and that error value $\Delta_1$ is initially found to exist between the measured average output current and the desired average output current. If factor "b" is adjusted to correct error $\Delta_1$, the resulting transfer function will be as illustrated at 702b. This will successfully compensate for the error $\Delta_1$. Moreover, if the input voltage is suddenly increased to 100% of its maximum value, the corrective effect of additive factor "b" will remain the same, resulting in the same magnitude of correction $\Delta_1$ on an absolute scale. That is, the significance of "b" will be much smaller when considered as a fraction of the (higher) value "y" at 100%.

Referring back to FIG. 5, if it is determined in S502 that the measured average output current is less than the desired average output current, additive corrective factor "b" is increased by a first fixed amount (S514). If this increase causes "b" to exceed a predetermined limit (S516), "b" is zeroed (S518) and "a" is increased by one unit (S520). This change to "a" and/or "b" is of course for the purpose of increasing the duty cycle of the output PWM signal.

As should be apparent from the description of operation 500, when an error is discovered between the measured average output current and the desired average output current, the additive corrective factor "b" is initially used to attempt to correct the error. If attempts to correct the error using "b" are insufficient, however, the multiplicative factor "a" is used. This process is repeated until the error has been corrected.

It is noted that the multiplicative corrective factor "a" is only reduced or increased by one unit at a time in operation 500 (see S510 and S520). This is to ensure that average output current does not increase too suddenly in response to a detected error, but rather increases slowly over an interval perhaps spanning several pairs of PWM periods. Too sudden of an increase in average output current is usually undesirable as it may cause physical shock to mechanical systems or components controlled by the electronic device 62. Moreover, adjusting corrective factor "a" too suddenly may cause the average output current produced to overshoot its correct value. This may be especially risky in terms of damage to controlled mechanical systems (e.g. a solenoid could temporarily be driven too far). In any case, the above-described manner of adjusting corrective factor "a" unit-by-unit is acceptable because, after system startup, output current correction will typically only be necessary if the power supply fluctuates or if the inductance of the electronic device 62 changes. Especially in the latter case, slow correction is acceptable because the change in inductance will also usually be slow, typically being caused by a change in temperature of the device 62.

It will be appreciated that use of dual-slope integrator 70 in the feedback portion of current driver 50 provides certain advantages. Specifically, the dual-slope integrator 70 makes the current driver 50 less susceptible to diminished accuracy over time due to component degradation. For example, if the C value of capacitor 72 (FIG. 2) drifts over time, the determination of measured average output current will not be affected, since the effect of C during the integration and de-integration phases effectively cancels. As well, even if the initial capacitor voltage $V_{init}$ changes over time, this change has no effect since it is the difference between $V_{final}$ and $V_{init}$, and not the value of $V_{init}$, that is significant.

If the dither frequency of the PWM output is changed during system operation, the time period T during which the capacitor 72 of dual-slope integrator 70 charges will of course increase or decrease. This will result in a corresponding change to the capacitor's discharge time $t_{discharge}$ during the de-integration phase. To prevent any change in $t_{discharge}$ from being incorrectly interpreted as a change in average output current, a "reverse scaling factor" is applied to the $t_{discharge}$ measurement. The term "reverse" refers to the fact that this factor opposes the scaling factor applied in the PWM generator 58 to compensate for current dither frequency (i.e. the reverse scaling factor decreases, rather than increases, when PWM period T increases).

It will be appreciated that duty cycle calculator 56, error calculator 78 and other modules illustrated in FIG. 2 may be implemented in software executing on microcontroller 88. The term "module" does not necessarily connote a software function or subroutine.

As will be appreciated by those skilled in the art, modifications to the above-described embodiment can be made without departing from the essence of the invention. For example, the integration phase could be made to span multiple PWM periods rather than a single PWM period (with appropriate modification to the average current calculation) so as to improve error detection accuracy. This modification may however come at the expense of longer error correction response time (i.e. increased error correction delay).

Other modifications will be apparent to those skilled in the art and, therefore, the invention is defined in the claims.

What is claimed is:

1. A method of providing a controlled current to an electronic device, comprising: producing a pulse-width modulation (PWM) signal to provide said current; measuring an average of said current provided to the electronic device using a dual-slope integrator, wherein said measuring an average of said current results in a measured average current; and
setting a duty cycle of said pulse-width modulation signal based, at least in part, on said measuring,
wherein said setting a duty cycle comprises:
comparing said measured average current to an input value representing a desired average current; and
regulating said duty cycle of said pulse-width modulation signal based on said comparing;
wherein said duty cycle is computed by scaling said input value by a multiplicative factor and adding an additive factor; and
wherein said regulating comprises:
if said comparing indicates that said measured average current is less than said desired average current, increasing the additive factor by a first fixed amount;
if said increasing the additive factor by a first fixed amount results in said additive factor exceeding a limit: zeroing said additive factor; and increasing said multiplicative factor by a second fixed amount;
if said comparing indicates that said measured average current is greater than said desired average current, decreasing the additive factor by a first fixed amount; and
if said decreasing the additive factor by a first fixed amount results in said additive factor falling below a limit: zeroing said additive factor; and decreasing said multiplicative factor by a second fixed amount.

2. The method of claim 1 wherein said measuring an average of said current comprises: during a sampling interval, integrating a signal proportional to said current using said dual-slope integrator, said integrating resulting in an integrated signal; determining a magnitude of said integrated signal; and using said magnitude of said integrated signal and a length of said sampling interval to calculate a measured average current.

3. The method of claim 2 wherein said integrating comprises charging a capacitor from an initial level to a final level and wherein said determining a magnitude comprises calculating a time for discharging said capacitor at a known rate from said final level to said initial level.

4. The method of claim 2 wherein said sampling interval is a PWM period.

5. The method of claim 4 wherein said PWM period is a first PWM period, and wherein said determining a magnitude is performed during a second PWM period immediately following said first PWM period.

6. The method of claim 5 wherein said setting a duty cycle is effective in said pulse-width modulation signal during a third PWM period immediately following said second PWM period.

7. The method of claim 1 wherein said input value is a digital representation of an input voltage.

8. The method of claim 1 wherein said setting a duty cycle comprises scaling an input value representing a desired average current by a multiplicative factor and adding an additive factor, said scaling and adding resulting in a calculated duty cycle.

9. The method of claim 8 wherein said scaling and adding are completed during a first PWM period and said calculated duty cycle is effective in said pulse-width modulation during a second PWM period immediately following said first PWM period.

10. A system for providing a controlled current to an electronic device, comprising:
- a pulse-width modulation (PWM) signal generator for providing said current;
- a dual-slope integrator for use in measuring an average current supplied to the electronic device, said measuring resulting in a measured average current;
- a duty cycle calculator for calculating a duty cycle of said pulse-width modulation based, at least in part, on said measured average current: wherein said duty cycle calculator calculates said duty cycle by scaling said input value by a scalar and adding an additive factor, said scaling and adding resulting in a calculated duty cycle;
- an error calculator for comparing said measured average current to an input value representing a desired average current and for calculating an error value based on said comparing, wherein:
  - if said error value indicates that said measured average current is less than said desired average current, said duty cycle calculator increases the additive factor by a first fixed amount;
  - if said additive factor exceeds a limit, said duty cycle calculator: zeros said additive factor; and increases said multiplicative factor by a second fixed amount;
  - if said error value indicates that said measured average current is greater than said desired average current, said duty cycle calculator decreases the additive factor by a first fixed amount;
  - if said additive falls below a limit, said duty cycle calculator: zeroes said additive factor; and decreases said multiplicative factor by a second fixed amount.

11. The system of claim 10 wherein said measuring an average current comprises: during a sampling interval, integrating a signal proportional to said current using said dual-slope integrator, said integrating resulting in an integrated signal; determining a magnitude of said integrated signal; and using said magnitude of said integrated signal and a length of said sampling interval to calculate a measured average current.

12. The system of claim 11 wherein said sampling interval is a PWM period.

13. The system of claim 10 wherein said input value is a digital representation of an input voltage.

14. The system of claim 10 wherein said scaling and adding are completed during a first PWM period and said calculated duty cycle is effective in said pulse-width modulation during a second PWM period immediately following said first PWM period.

15. The system of claim 10 wherein said duty cycle calculator calculates said duty cycle by scaling an input value representing a desired average current by a scalar and adding an additive factor.

16. The system of claim 15 wherein, if said input value is received during a first PWM period, said duty cycle calculator calculates said duty cycle for effectiveness in said pulse-width modulation signal during a second PWM period, said second PWM period immediately following said first PWM period.

17. A computer-readable medium storing instructions which, when executed by a computing device in a system for providing a controlled current to an electronic device by way of a pulse-width modulation (PWM) signal, cause said computing device to:
(a) calculate from measurements produced by a dual-slope integrator a measured average current supplied to the electronic device; and
(b) set a duty cycle of said pulse-width modulation signal based, at least in part, on said measured average current comprises:
  - comparing said measured average current to an input value representing a desired average current; and
  - regulating said duty cycle of said pulse-width modulation signal based on said comparing;
  - wherein said duty cycle is computed by scaling said input value by a multiplicative factor and adding an additive factor;
  - wherein said regulating comprises:
    - if said comparing indicates that said measured average current is less than said desired average current, increasing the additive factor by a first fixed amount;
    - if said increasing the additive factor by a first fixed amount results in said additive factor exceeding a limit: zeroing said additive factor; and increasing said multiplicative factor by a second fixed amount;
    - if said comparing indicates that said measured average current is greater than said desired average current, decreasing the additive factor by a first fixed amount; and
    - if said decreasing the additive factor by a first fixed amount results in said additive factor falling below a limit: zeroing said additive factor; and decreasing said multiplicative factor by a second fixed amount.

18. The computer-readable medium of claim 17 wherein (a) comprises: determining a duration of de-integration of an integrated signal, said integrated signal having been integrated during a sampling interval by said dual-slope integrator from a signal proportional to the current provided to said electronic device; and using said duration and a length of said sampling interval to calculate said measured average current.

19. The computer-readable medium of claim 18 wherein said sampling interval is a PWM period.

20. The computer-readable medium of claim 17 wherein said input value is a digital representation of an input voltage.

21. The computer-readable medium of claim 17 wherein (b) comprises scaling an input value representing a desired average current by a multiplicative factor and adding an additive factor, said scaling and adding resulting in a calculated duty cycle.

22. The computer-readable medium of claim 21 wherein said scaling and adding are completed during a first PWM period and said calculated duty cycle is effective in said pulse-width modulation during a second PWM period immediately following said first PWM period.

* * * * *